United States Patent
Bryant et al.

(10) Patent No.: US 6,551,091 B1
(45) Date of Patent: Apr. 22, 2003

(54) FLEXIBLE INFLATABLE SUPPORT STRUCTURE FOR USE WITH A REUSABLE COMPACTION BAG

(75) Inventors: William J. Bryant, Wichita, KS (US); William Tod Ross, Cheney, KS (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 09/661,938

(22) Filed: Sep. 14, 2000

(51) Int. Cl.[7] .............................................. B29C 51/28
(52) U.S. Cl. ..................... 425/389; 425/405.1; 264/316; 264/571
(58) Field of Search ............................ 249/65; 425/389, 425/388, 390, 405.1, 503, 504; 156/382; 264/316, 571; 52/2.18

(56) References Cited

U.S. PATENT DOCUMENTS

| | | | | |
|---|---|---|---|---|
| 4,026,340 A | | 5/1977 | Sobolik ........................ 383/33 |
| 4,365,455 A | * | 12/1982 | Braine .......................... 263/32 |
| 4,568,057 A | * | 2/1986 | Freeman ....................... 249/65 |
| 4,583,330 A | * | 4/1986 | Huang .......................... 52/2.15 |
| 4,698,115 A | | 10/1987 | Dodds .......................... 156/382 |
| 4,941,754 A | | 7/1990 | Murdock ....................... 383/33 |
| 5,316,462 A | | 5/1994 | Seemann ...................... 425/389 |
| 5,400,999 A | * | 3/1995 | Pavie ............................ 249/65 |
| 5,570,544 A | * | 11/1996 | Hale et al. ..................... 52/218 |
| 5,874,151 A | * | 2/1999 | Cohee et al. |

OTHER PUBLICATIONS

Catalog from Torr Technologies Inc. titled "Vacuum & Pressure Bagging Tools" (date of publication unknown).

* cited by examiner

Primary Examiner—Jan H. Silbaugh
Assistant Examiner—Thu Khanh T. Nguyen
(74) Attorney, Agent, or Firm—Harness Dickey & Pierce P.L.C.

(57) ABSTRACT

A reusable vacuum bag apparatus for use in a compaction operation by which composite parts are formed. The apparatus includes a flexible, inflatable support structure which is secured to a reusable flexible mat vacuum bag. When inflated, the support structure maintains the vacuum bag in the orientation it needs to assume when placed on a forming tool associated with a compaction apparatus. The support structure is formed by a plurality of intercoupled linear and curving tubing segments which form a grid-like support structure. The support structure is shaped in accordance with the configuration and contours of the reusable vacuum bag portion, which is in turn shaped in accordance with a forming tool. The support structure can be de-inflated, which allows the vacuum bag secured thereto to be stored in a compact arrangement when not in use. The hollow tubular support structure also provides a very light support framework which is much more easily manipulated and handled by a lay-up mechanic when positioning the apparatus 10 on a forming tool.

26 Claims, 2 Drawing Sheets

FLEXIBLE INFLATABLE SUPPORT STRUCTURE FOR USE WITH A REUSABLE COMPACTION BAG

TECHNICAL FIELD

This invention relates to support structures for supporting large or small areas of flexible materials used in a manufacturing process, and more particularly to a lightweight, inflatable support structure for use with a reusable compaction bag used in a compaction process for fabricating composite parts.

BACKGROUND OF THE INVENTION

Since the introduction of reusable vacuum bags on large and small composite structures, there has been a need for a support structure that is able to hold the reusable vacuum bag in a desired orientation during the application and usage of the vacuum bag, and which is able to be stored in a compact configuration, together with its attached reusable vacuum bag, when the support structure and vacuum bag are not in use. If a support structure is not used with the reusable vacuum bag, then the lay-up mechanic must lift the bag and position it on a work piece to perform a compaction operation. This can be a time consuming process, depending on the size of the vacuum bag and the shape of the forming tool on which it is being placed.

Structures which have previously been used to support reusable vacuum bags have traditionally been very rigid and heavy, and typically made from metal or aluminum. After the reusable compaction bag is secured to the rigid support structure, the assembly then requires a large storage space (essentially the size of the reusable vacuum bag when in its operative configuration) when the vacuum bag is not being used. With such a rigid structure secured to the reusable vacuum bag, lifting and removing of the support structure/vacuum bag combination also becomes very cumbersome and can often require additional equipment for moving the assembly. Also, since these support structures have traditionally been constructed of rigid materials (i.e., metal or aluminum tubing), if they are dropped or become bent in transit, they will require straightening back to their original shape.

Since presently used support structures are typically made from dissimilar materials from the vacuum bag, such as aluminum, steel, fiberglass or spring steel, fastening of the vacuum bag to the support structure in a manner such that the vacuum bag is able to make continuous contact with the forming tool can also be difficult. In order to keep the forming tool and the vacuum bag support structure together, they are often attached with a hinge along one side of the support structure and the vacuum bag. This makes one side of the forming tool inaccessible to the lay-up mechanic and, if the tool is very large, also creates an ergonomic concern. More specifically, the lay-up mechanic is then required to lift and lower the hinged support structure onto the forming tool by reaching over the forming tool, which can be physically difficult and strenuous for the operator. Also, in many cases where the support structure and the forming tool are attached with a hinge, this will necessitate a mechanism to assist the lay-up mechanic, such as one or more air cylinders or counter balances, in positions to assist in lifting and lowering the hingedly attached support structure and its attached vacuum bag.

Accordingly, it is a principal object of the present invention to provide a support structure for use with a reusable vacuum bag used in fabricating composite parts, where the support structure forms a lightweight, easy to handle support structure which can be easily collapsed into a compact arrangement for storage when the vacuum bag is not needed.

It is still another object of the present invention to provide a support structure to which a reusable vacuum bag can be readily attached, and where the support structure forms a tubular support structure which can be inflated with a pressurized gas or fluid to expand and/or stretch the vacuum bag out into the orientation required for the bag to be placed over a forming tool, and which can be de-inflated to collapse the support frame structure when the vacuum bag is not needed. Such a support structure would allow the vacuum bag to be stored in a compact configuration when not needed and quickly opened into its operative orientation simply by inflating the support structure.

It is another object of the present invention to provide a support structure to which a reusable vacuum bag can be attached, where the support structure forms a lightweight, inflatable and de-inflatable structure comprised of a plurality of tubing segments intercoupled together to form a single support framework which is easily handled and manipulated by a lay-up mechanic.

SUMMARY OF THE INVENTION

The above and other objects are provided by a vacuum bag apparatus in accordance with preferred embodiments of the present invention. In one preferred embodiment, the apparatus comprises an inflatable support structure having a flexible mat, reusable vacuum bag secured thereto at various points about the support structure. The support structure is formed from one or more tube-like elements which are secured together to form a single support framework for supporting the vacuum bag.

The tubing from which the support structure is formed may vary in construction, but in one preferred form is comprised of a multi-layer construction consisting of a reinforcement layer, and inner and outer layers sandwiching the reinforcement layer therebetween. The reusable vacuum bag is permanently secured to the support frame.

When a pressurized gas, such as pressurized air, is injected into the support structure through a suitable valve secured thereto, the support structure is inflated and stretches the vacuum bag into the orientation required for the bag to be placed on a forming tool used in a compaction process. When the apparatus is not needed it may be easily de-inflated and folded into a relatively compact form for storage.

A principal advantage of the apparatus is its light weight construction. This makes the apparatus especially easy for a lay-up mechanic to manipulate when lifting and/or positioning the apparatus on a forming tool. An additional advantage is that since the support structure is still somewhat flexible, even when inflated, damage caused by accidental dropping or bumping of the apparatus against other structures, which would ordinarily require straightening of a metal or aluminum support structure, will in most cases cause no damage to the apparatus.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
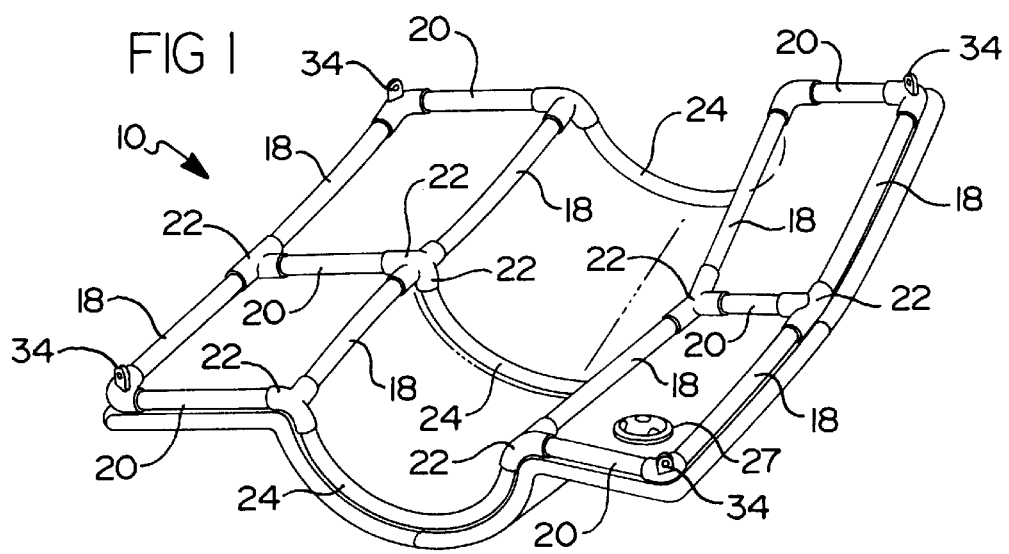
FIG. 1 shows a perspective view of a vacuum bag apparatus in accordance with a preferred embodiment of the present invention.
Figure 2:
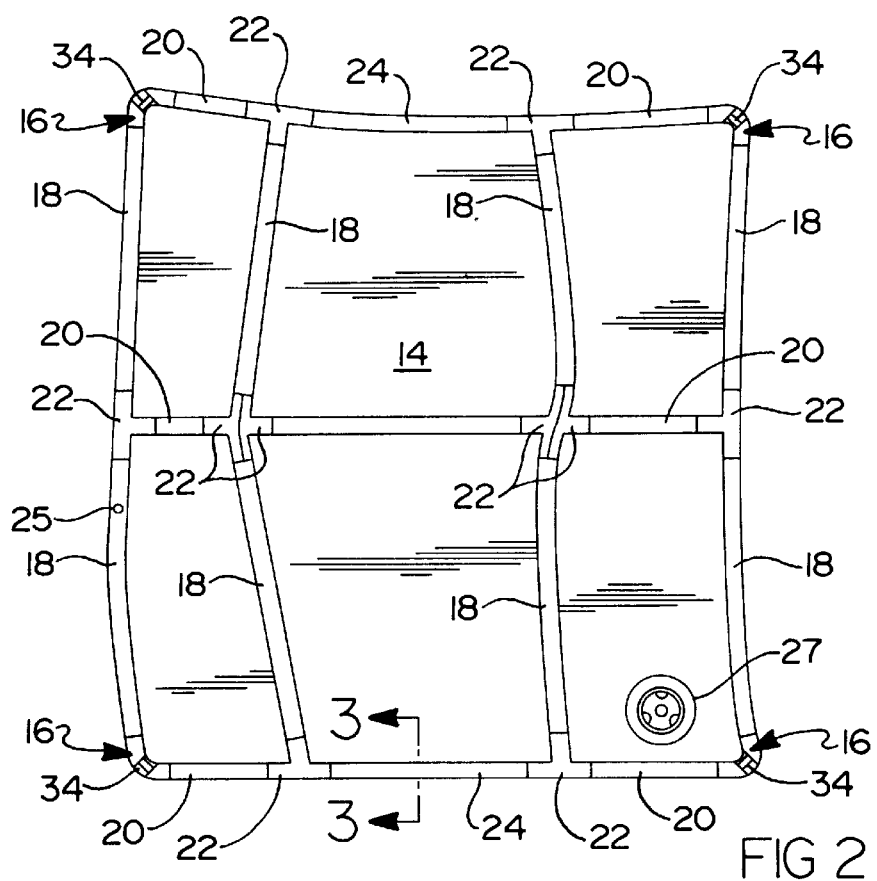
FIG. 2 shows a plan view of the vacuum bag apparatus of FIG. 1.

Referring to FIGS. 1 and 2, there is shown a reusable vacuum bag apparatus 10 incorporating a flexible, inflatable support structure comprising tubular segments 16–24 for supporting a flexible, reusable vacuum bag 14. It will be appreciated immediately that the configuration of the apparatus 10 shown in FIG. 1 is presented merely as one example of a configuration which the apparatus 10 may take. The apparatus 10 could readily be configured into a variety of other shapes to be usable with different shaped forming tools. The apparatus 10 is used by applying it to a forming tool to assist in fabricating composite parts in accordance with a well known compaction operation.

With further reference to FIGS. 1 and 2, the apparatus 10 is formed by a plurality of tubular 90° elbow segments 16, first tubular linear segments 18, second tubular linear segments 20, saddle "T" segments 22 and curved tubular segments 24. The inner diameter of the elbow segments 16 and the T-segments 22 is preferably just slightly larger than the outer diameter of the linear segments 18 and 20 and the curved tubular segments 24. Thus, the linear segments 18 and 20 and the curved segments 24 can be coupled to the elbow segment 16 and the T-segment 22 by inserting end portions of the segments 18, 20 and 24 into portions of the elbow segments 16 and T-segments 22, much as like a metal or plastic pipe circuit connected with elbows and T-fittings. The segments 16–24 are adhered together with a suitable adhesive/sealant such as RTV 157 manufactured by The General Electric Co.

Figure 3:
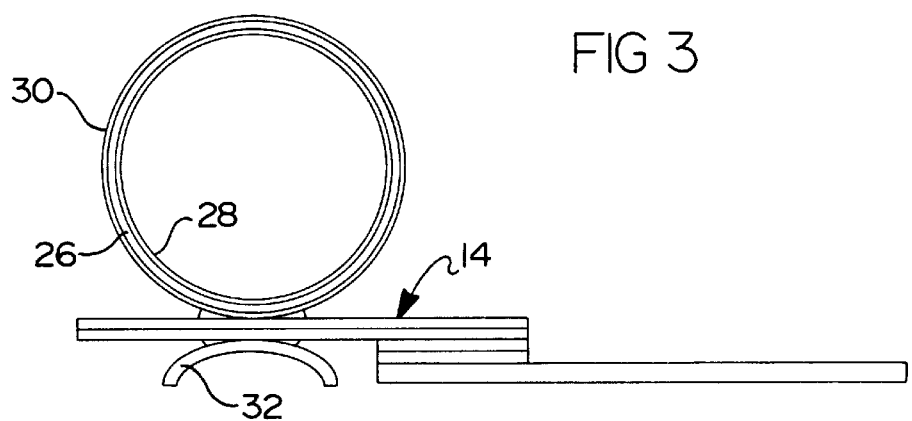
FIG. 3 shows a cross sectional view of one section of the support structure of FIG. 2 in accordance with section line 3—3 in FIG. 2, illustrating a tubing segment bonded to a portion of the reusable vacuum bag.

Once assembled into the form shown in FIGS. 1 and 2, the apparatus 10 forms a lightweight apparatus which can be handled and manipulated much more easily by a lay-up mechanic than previous support frames having metal, aluminum or other permanently rigid support structures. Each of the components 16–24 are formed from flexible tubing which is structurally strong yet light in weight. A suitable valve 25 is attached to one of the tubing segments 16–24 to provide a means for supplying pressurized gas (i.e., a pressurized fluid) into the interior areas of the tubing segments 16–24. Also visible in FIG. 2 is a valve 27 to which a vacuum tube can be secured. In this manner a vacuum force can be applied to the vacuum bag 14 once it is secured to a forming tool. In FIG. 3, one preferred construction is illustrated for the tubing segments 16–24 of the apparatus 10 by way of the construction of segment 18. An inner reinforcement layer 26 is sandwiched between a flexible inner layer 28 and a flexible outer layer 30. The reinforcement layer 30 may be comprised of fiberglass or another like, flexible material. The inner and outer layers 28 and 30, respectively, may each be comprised of a flexible material such as rubber. When the interior area of the tubing segment 18 is not receiving a pressurized gas, such as pressurized air, the segment 18 is able to collapse to a significant degree. Since each of the segments 18–24 are coupled to form one hollow, tubular grid-like support structure, applying a pressurized gas via the valve 25 (FIG. 2) causes all of the tubing segments 16–24 to be inflated into the cross sectional shape shown in FIG. 3. Since the reinforcement layer 26 is not stretchable to any significant degree, the overall cross sectional shape of each segment 16–24 remains reasonably uniform when the support structure 12 is fully inflated with a pressurized gas source. The pressure to which the support structure 12 is inflated is preferably about 8–10 psi.

FIG. 3 also illustrates a section of the flexible mat vacuum bag 14 secured to the tubing section 18. Any suitable adhesive, adhesive/sealant, may be used to secure the vacuum bag 14 to the tubing segment 18. Specific details of the construction of one preferred form of vacuum bag may be found in U.S. Pat. No. 5,716,488, entitled "A Reusable Vacuum Bag for Making Laminated Articles", the disclosure of which is hereby incorporated by reference into the present application.

FIG. 3 also illustrates a sealing edge 32 which can be attached to the forming tool when the apparatus 10 is disposed on the forming tool to form an airtight seal therebetween.

Figure 4:
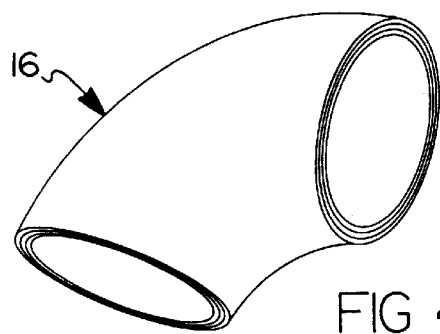
FIG. 4 illustrates a perspective view of one of a plurality of 90° elbow segments used to form the support structure shown in FIGS. 1 and 2.
Figure 5:
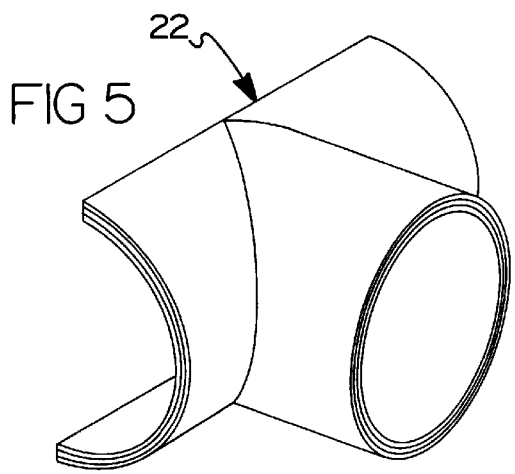
FIG. 5 shows a perspective view of a saddle "T" segment used to form the support structure of FIGS. 1 and 2.
Figure 6:
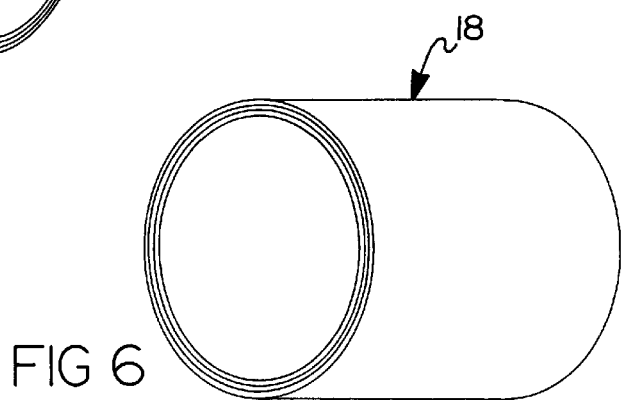
FIG. 6 shows a perspective view of a linear tubular connecting segment used to form the support structure of FIG. 1.

Referring to FIG. 4, the 90° elbow segment 16 is shown in greater detail. FIG. 4 illustrates the T-segment 22. FIG. 5 illustrates a portion of one of the linear segments 18. It will be appreciated that other specific shapes of coupling segments could be constructed to meet the needs of specific framework support structures. For example, rather than a 90° elbow segment 16 as illustrated in FIG. 4, a 45° elbow segment could readily be formed. Similarly, rather than a T-segment 22 as shown in FIG. 4, a 4-way, star-shaped segment could also be readily formed for interconnecting portions of four independent tubing segments. With further reference to FIG. 2, a loop shaped length of material 34 (preferably rubber) is also adhered to the support structure at each corner thereof, and also at one or more intermediate positions. The loop shaped lengths of material 34 allow chains, cables or other support elements to be removably secured thereto to allow a device such as an overhead mounted winch to lift the apparatus 10 if needed.

The apparatus 10 is placed into use by inflating it from a suitable source of compressed air so that the support structure 12 is fully inflated. When fully inflated, the support structure 12 will stretch out the flexible mat vacuum bag 14 secured thereto into the configuration needed to conform to the forming tool. Once the support structure is fully inflated and thus rigid, the support structure can be attached to overhead lifting cables via the loops 34, if needed, to apply and remove the apparatus 10 to/from the forming tool during fabrication of composite structures or parts. This process enables the lay-up mechanic to quickly and easily apply the apparatus 10 to the forming tool. The apparatus 10 also functions to hold the vacuum bag 14 rigid and to the fabricated shape of the work piece during the removal or staging portion of the manufacturing process when the vacuum bag 14 is not in use. Maintaining the vacuum bag 14 in the shape of the forming tool during the staging process ensures that when the vacuum bag 14 is reapplied for a compaction, the vacuum bag 14 will function properly. The apparatus 10 also functions to improve the edge seal of the vacuum bag 14 to the forming tool to thereby establish an improved vacuum between the vacuum bag 14 and the forming tool, and further eliminates the need for the operator to physically apply the vacuum bag 14 to the forming tool.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An inflatable support structure for supporting a reusable vacuum bag used in a composite manufacturing process, said support structure comprising:
   a tubular, flexible framework defining a structure adapted to support said reusable vacuum bag in an operative orientation when said reusable vacuum bag is secured thereto;
   said tubular, flexible structure being inflatable by a pressurized fluid source such that when pressurized, said framework presents said reusable vacuum bag secured thereto in an orientation ready to be placed on a work piece during said manufacturing process; and
   wherein said tubular flexible framework support structure can be de-pressurized to allow said structure and said reusable vacuum bag secured thereto to be formed into a compact assembly for storage.

2. The support structure of claim 1, wherein said support structure for supporting said reusable vacuum bag comprises a plurality of independent tubular segments joined together to form said support structure.

3. The support structure of claim 2, wherein at least one of said independent tubular support segments comprises a 90 degree tubular elbow.

4. The support structure of claim 2, wherein at least one of said independent tubular support segments comprises a linear tubular segment.

5. The support structure of claim 2, wherein at least one of said independent tubular support segments comprises a tubular curving segment.

6. The support structure of claim 2, wherein at least one of said independent tubular support segments comprises a tubular T-shaped for interconnecting three other ones of said tubular support segments.

7. The support structure of claim 1, wherein said tubular, flexible framework comprises a multilayer, flexible material.

8. The support structure of claim 1, wherein said tubular, flexible framework comprises a central reinforcement layer, an inner layer and an outer layer, wherein said inner and outer layers sandwich said reinforcement layer therebetween.

9. The support structure of claim 8, wherein at least one of said inner and outer layers is comprised of rubber.

10. The support structure of claim 8, wherein said reinforcement layer is comprised of fiberglass.

11. A reusable vacuum bag apparatus having an inflatable support structure for supporting said apparatus in an orientation ready to be applied to a forming tool, said apparatus comprising:
    a reusable mat vacuum bag;
    a tubular, flexible framework support structure secured to said vacuum bag, said tubular, flexible framework support structure defining a support structure adapted to support said reusable vacuum bag in an operative orientation; and
    said tubular, flexible framework support structure being inflatable by a pressurized fluid source such that when pressurized, said flexible framework support structure presents said reusable vacuum bag secured thereto in an orientation ready to be placed on said forming tool during a manufacturing process; and
    wherein said tubular flexible framework support structure can be de-pressurized to allow said structure and said reusable vacuum bag secured thereto to be formed into a compact assembly for storage.

12. The support structure of claim 11, wherein said tubular, flexible framework support structure comprises a plurality of independent tubular segments joined together in an airtight fashion.

13. The support structure of claim 12, wherein at least one of said independent tubular support segments comprises a 90 degree tubular elbow.

14. The support structure of claim 12, wherein at least one of said independent tubular support segments comprises a linear tubular segment.

15. The support structure of claim 12, wherein at least one of said independent tubular support segments comprises a tubular curving segment.

16. The support structure of claim 12, wherein at least one of said independent tubular support segments comprises a tubular T-shaped segment for interconnecting three other ones of said tubular support segments.

17. The support structure of claim 11, wherein said tubular, flexible framework support structure comprises a multilayer, flexible material.

18. The support structure of claim 11, wherein said tubular, flexible framework support structure comprises a central reinforcement layer, an inner layer and an outer layer, wherein said inner and outer layers sandwich said reinforcement layer therebetween.

19. The support structure of claim 18, wherein at least one of said inner and outer layers is comprised of rubber.

20. A reusable vacuum bag apparatus having an inflatable support structure for supporting said apparatus in an orientation ready to be applied to a work piece, said apparatus comprising:
    a reusable vacuum bag;
    a tubular, flexible framework secured to said vacuum bag, said tubular, flexible framework defining a support structure comprised of a plurality of intercoupled tubular segments which, when assembled to form said tubular flexible framework, support said reusable vacuum bag in an operative orientation ready to be placed on a work piece;
    said tubular, flexible framework being inflatable by a pressurized fluid source such that when filled with a pressurized fluid, said framework presents said reusable vacuum bag secured thereto in an orientation easily able to manipulated by an individual and easily placed on said work piece during a manufacturing process;
    each of said tubular segments of said tubular, flexible framework including an inner layer, an outer layer and a reinforcement layer therebetween; and
    wherein said tubular flexible framework can be de-pressurized to allow said framework and said reusable vacuum bag secured thereto to be formed into a compact assembly for storage.

21. The support structure of claim 2, wherein at least one of said independent tubular support segments comprises a port for enabling at least one of inflation and deflation of said tubular flexible support structure.

22. The support structure of claim 12, wherein at least one of said independent tubular support segments comprises a port for enabling at least one of inflation and deflation of said tubular flexible support structure.

23. The support structure of claim 20, wherein at least one of said intercoupled tubular segments comprises a port for enabling at least one of inflation and deflation of said tubular flexible support structure.

24. The inflation support structure of claim 1, wherein said reusable vacuum bag comprises a vacuum tube connection port.

25. The reusable vacuum bag apparatus of claim 11, wherein said reusable vacuum bag comprises a vacuum tube connection port.

26. The reusable vacuum bag apparatus of claim 20, wherein said reusable vacuum bag comprises a vacuum tube connection port.

* * * * *